(12) United States Patent
Wang

(10) Patent No.: US 6,795,915 B2
(45) Date of Patent: Sep. 21, 2004

(54) COMPUTER SYSTEM AND METHOD FOR SETTING UP INFORMATION ON AN OPERATING SYSTEM THEREOF

(75) Inventor: Houk Wang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 696 days.

(21) Appl. No.: 09/836,364

(22) Filed: Apr. 18, 2001

(65) Prior Publication Data

US 2002/0049898 A1 Apr. 25, 2002

(30) Foreign Application Priority Data

Oct. 19, 2000 (KR) .......................................... 2000-61709

(51) Int. Cl.[7] .......................................... G06F 15/177
(52) U.S. Cl. .......................................... 713/2; 713/100
(58) Field of Search ................................ 713/1, 2, 100

(56) References Cited

U.S. PATENT DOCUMENTS

| | | | |
|---|---|---|---|
| 5,136,711 A | | 8/1992 | Hugard et al. |
| 5,497,490 A | | 3/1996 | Harada et al. |
| 5,694,600 A | * | 12/1997 | Khenson et al. ............... 713/2 |
| 5,701,477 A | * | 12/1997 | Chejlava, Jr. .................. 713/2 |
| 6,052,781 A | | 4/2000 | Weber |
| 6,721,885 B1 | * | 4/2004 | Freeman et al. ............... 713/2 |

FOREIGN PATENT DOCUMENTS

| | | |
|---|---|---|
| JP | 2-181247 | 7/1990 |
| JP | 7-028700 | 1/1995 |
| JP | 10-240503 | 9/1998 |
| JP | 11-085529 | 3/1999 |

* cited by examiner

*Primary Examiner*—Dennis M. Butler
(74) *Attorney, Agent, or Firm*—Robert E. Bushnell, Esq.

(57) ABSTRACT

A computer system comprises: a non-volatile memory for storing therein a BIOS table relating to basic operation of the computer system; an auxiliary memory for storing an operating system of the computer system; an information memory provided in the auxiliary memory for storing therein information on the operating system; and a BIOS controller for automatically setting up the BIOS table of the non-volatile memory based on the OS information stored in the information memory when a BIOS POST routine of the computer system is executed. With this configuration, although an auxiliary memory device storing the OS of the computer system according to the present invention is replaced, the OS information can be automatically set up in the BIOS table, thereby providing a convenience to the user. In addition, according to the present invention, a computer system needs no rebooting thereof due to OS change in the BIOS table.

21 Claims, 6 Drawing Sheets

COMPUTER SYSTEM AND METHOD FOR SETTING UP INFORMATION ON AN OPERATING SYSTEM THEREOF

CLAIM OF PRIORITY

This application makes reference to, incorporates the same herein, and claims all benefits accruing under 35 U.S.C. §119 from my application COMPUTER SYSTEM AND METHOD FOR SETTING UP AN OPERATING SYSTEM INFORMATION THEREOF filed with the Korean Industrial Property Office on Oct. 19, 2000 and there duly assigned Ser. No. 61709/2000.

BACKGROUND OF THE INVENTION

1. Technical Field

The present invention relates to a computer system and a method for automatically setting up information on an operating system thereof in a basic input/output system (BIOS) table.

2. Related Art

With development of computers, peripheral devices thereof have been developed, thereby allowing computer users to use a plurality of operating systems in a computer system. The users use a plurality of operating systems as needed, and each operating system is stored in its corresponding hard disk drive. To use a different operating system, a hard disk drive in use is replaced with a corresponding different hard disk drive. For this purpose, a user is requested to change information on an operating system by running a CMOS set-up program at the time of booting up the computer system.

Figure 6:
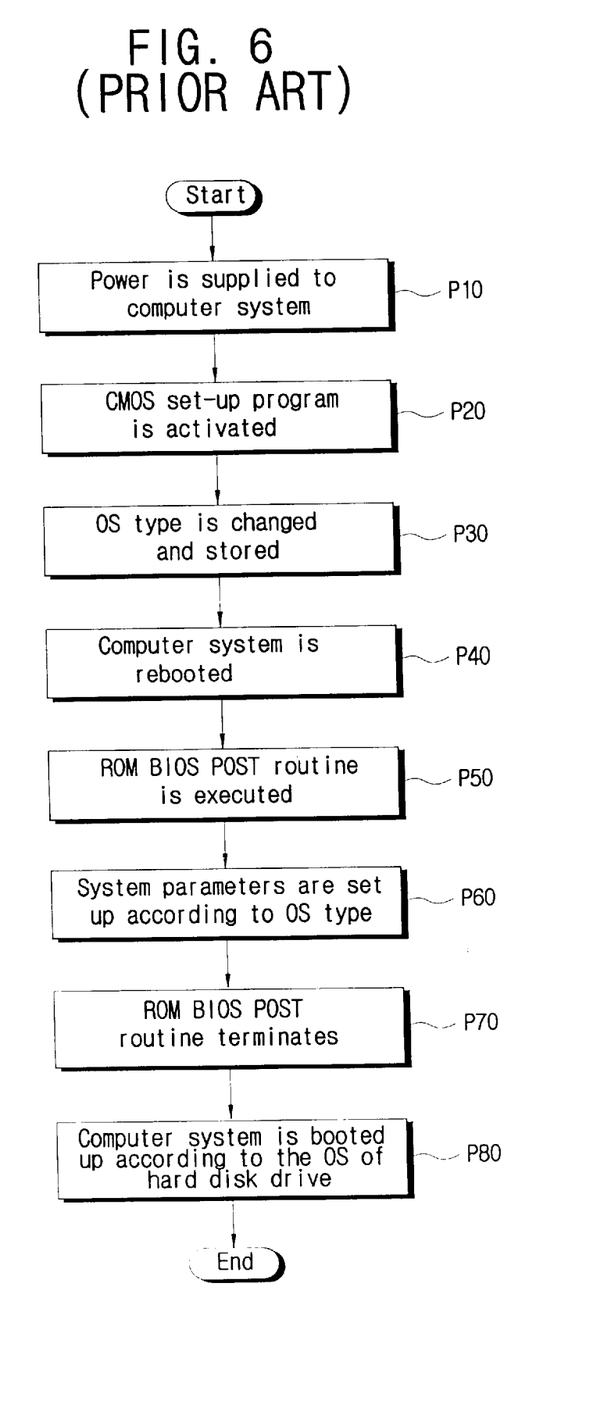
FIG. 6 is a flow chart showing a process of booting a conventional computer system.

The process of booting a computer system by replacing a hard disk drive in which an operating system is stored will be described with respect to FIG. 6.

First, the user supplies external power to the computer system (P10), and a CMOS set-up program is then executed (P20). Information on a new operating system, such as WINDOWS98/WINDOWS2000 ACPI, WINDOWS98 APM, and so on, stored in its corresponding hard disk drive, is stored in a BIOS table (P30). Then, the computer system is rebooted (P40), and the computer system executes a read only memory (ROM) BIOS power-on self-test (POST) routine (P50). According to the ROM BIOS POST routine, peripheral devices and hard disk drives of the computer system are checked, and the system parameters are set up according to the operating system stored in the BIOS table of the CMOS set-up program (P60). The ROM BIOS POST routine terminates (P70), and the computer system is rebooted under the new operating system stored in the hard disk drive (P80).

However, according to the conventional method, a user has to repeat the above-described process whenever a hard disk drive is replaced. It is cumbersome and time-consuming to change information of the operating system stored in the hard disk drive by running the CMOS set-up program every time. Furthermore, if incorrect or wrong information of the operating system is set up, the computer system will malfunction.

Therefore, there is a need for a method of automatically setting up information on an operating system stored in the hard disk drive in the CMOS set-up BIOS table at the same time that external power is supplied to the computer system.

The following patents are considered to be representative of the prior art, and are burdened by the disadvantages set forth herein: U.S. Pat. No. 5,136,711 to Hugard et al., entitled SYSTEM FOR MULTIPLE ACCESS HARD DISK PARTITIONING, issued on Aug. 4, 1992, U.S. Pat. No. 5,497,490 to Harada et al., entitled AUTOMATIC RECONFIGURATION OF ALTERABLE SYSTEMS, issued on Mar. 5, 1996, U.S. Pat. No. 6,052,781 to Weber, entitled MULTIPLE USER COMPUTER INCLUDING ANTI-CONCURRENT USER-CLASS BASED DISJUNCTIVE SEPARATION OF PLURAL HARD DRIVE OPERATION, issued on Apr. 18, 2000, Japanese Patent No. 2-181247 to Kashiyado, entitled PROGRAM LOADING SYSTEM, published on Jul. 16, 1990, Japanese Patent No. 7-028700 to Sano et al., entitled STORAGE DEVICE, published on Jan. 31, 1995, Japanese Patent No. 10-240503 to Honma, entitled DATA PROCESSOR, published on Sep. 11, 1998, and Japanese Patent No. 11-085529 to Sukegawa, entitled METHOD FOR STARTING DATA STORAGE SYSTEM AND COMPUTER SYSTEM, published on Mar. 30, 1999.

SUMMARY OF THE INVENTION

Therefore, the present invention has been developed in view of the above shortcomings, and it is an object of the present invention to provide a computer system comprising: a non-volatile memory for storing therein a BIOS table related to basic operation of the computer system; an auxiliary memory for storing an operating system of the computer system; an information memory provided in the auxiliary memory for storing therein information on the operating system; and a BIOS controller for automatically setting up the BIOS table of the non-volatile memory based on the OS information stored in the information memory when a BIOS POST routine of the computer system is executed.

Preferably, the BIOS controller is stored in the non-volatile memory. As a further preference, the auxiliary memory is comprised of a hard disk drive, the non-volatile memory is comprised of a flash memory, and the information memory is comprised of an EEPROM.

Effectively, the BIOS controller is configured so as to allow the BIOS table to be manually set up in the case where the information memory is not provided in the auxiliary memory.

According to another aspect of the present invention, the above and other objects may be achieved by provision of a method for setting up information on an operating system of a computer system in a BIOS table, the computer system comprising a non-volatile memory for storing therein the BIOS table relating to basic operation of the computer system and an auxiliary memory for storing the operating system of the computer system. The method comprises the steps of: providing an information memory capable of writing and reading thereon in the auxiliary memory; reading the OS information from outside to store the OS information in the information memory when the OS is installed in the auxiliary memory; and automatically setting up the BIOS table of the non-volatile memory based on the OS information stored in the information memory when a BIOS POST routine of the computer system is executed.

Effectively, the step of automatically setting up the BIOS table is conducted by a BIOS controller stored within the non-volatile memory.

Preferably, the auxiliary memory is a hard disk drive, the non-volatile memory is a flash memory, and the information memory is an EEPROM.

Effectively, the method further comprises the steps of: checking whether the information memory is provided in the auxiliary memory in the step of executing the BIOS POST routine by the BIOS controller; and manually setting up the BIOS table in the case where the information memory is not provided in the auxiliary memory.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, and wherein.

DETAILED DESCRIPTION OF THE PREFERRED EMBODIMENTS

Figure 1:
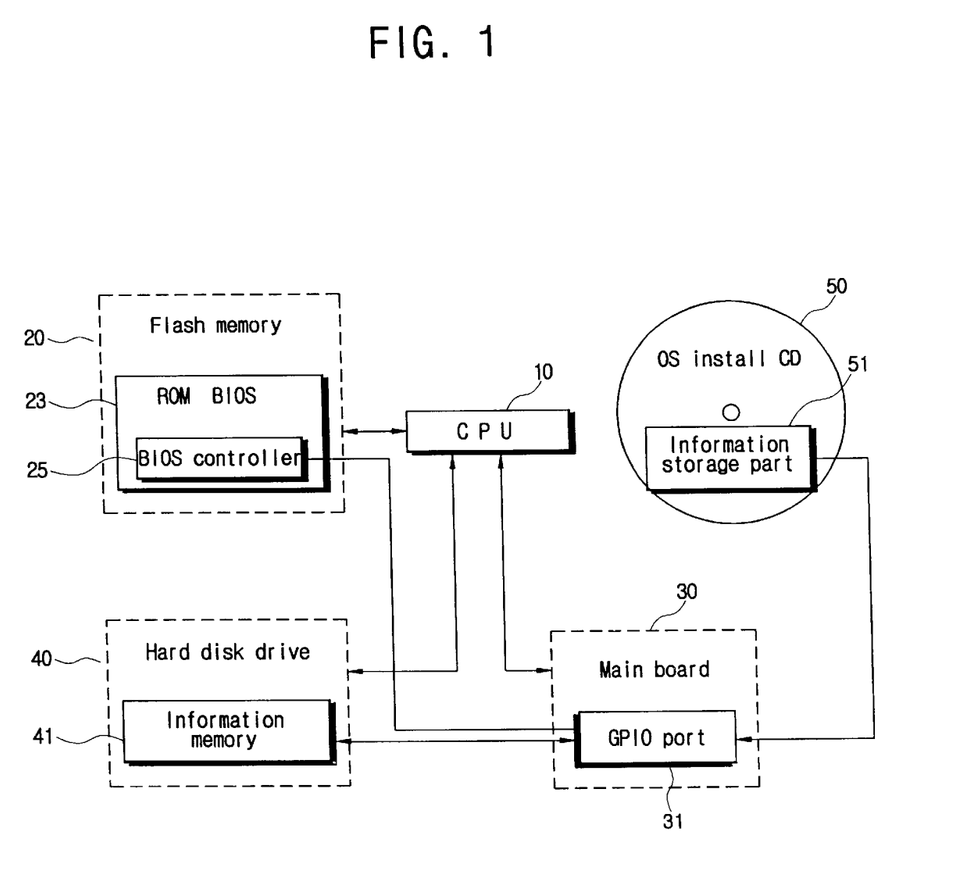
FIG. 1 is a block diagram of a computer system according to the present invention.
Figure 2:
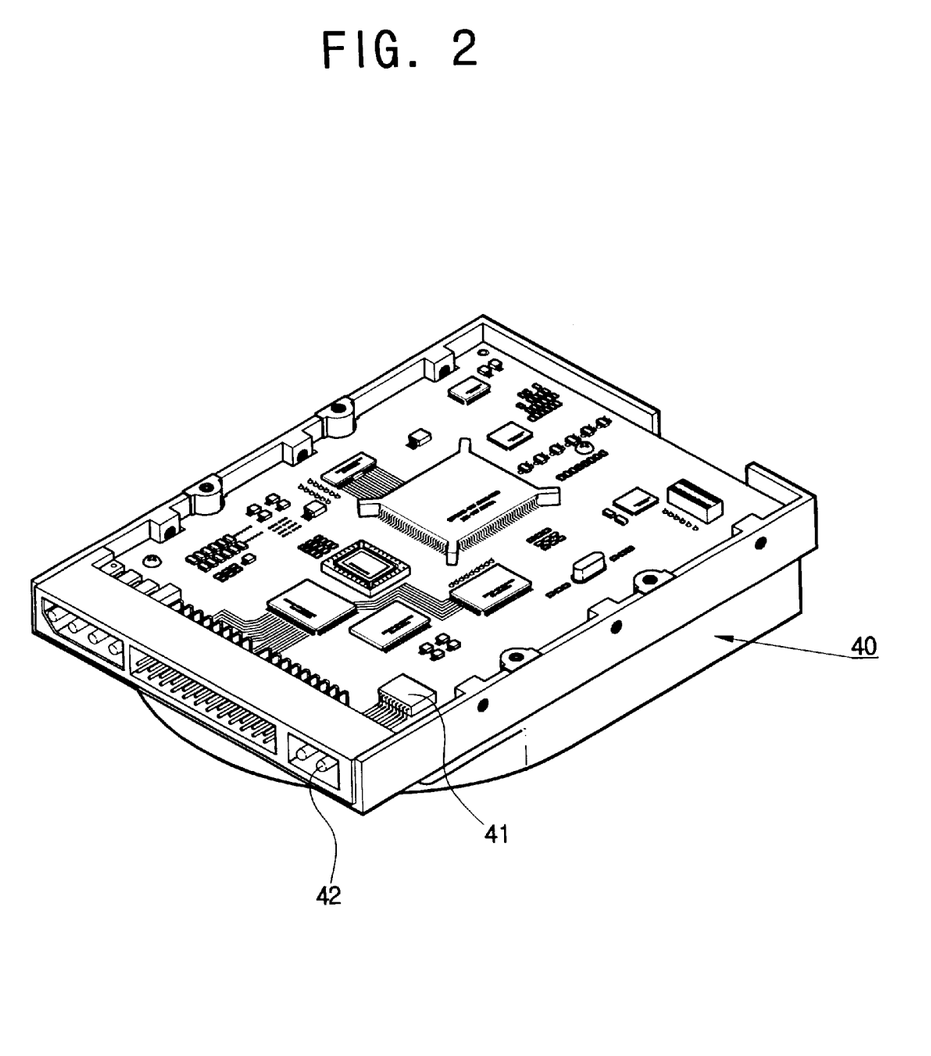
FIG. 2 is a perspective view of a hard disk drive according to the present invention.
Figure 3:
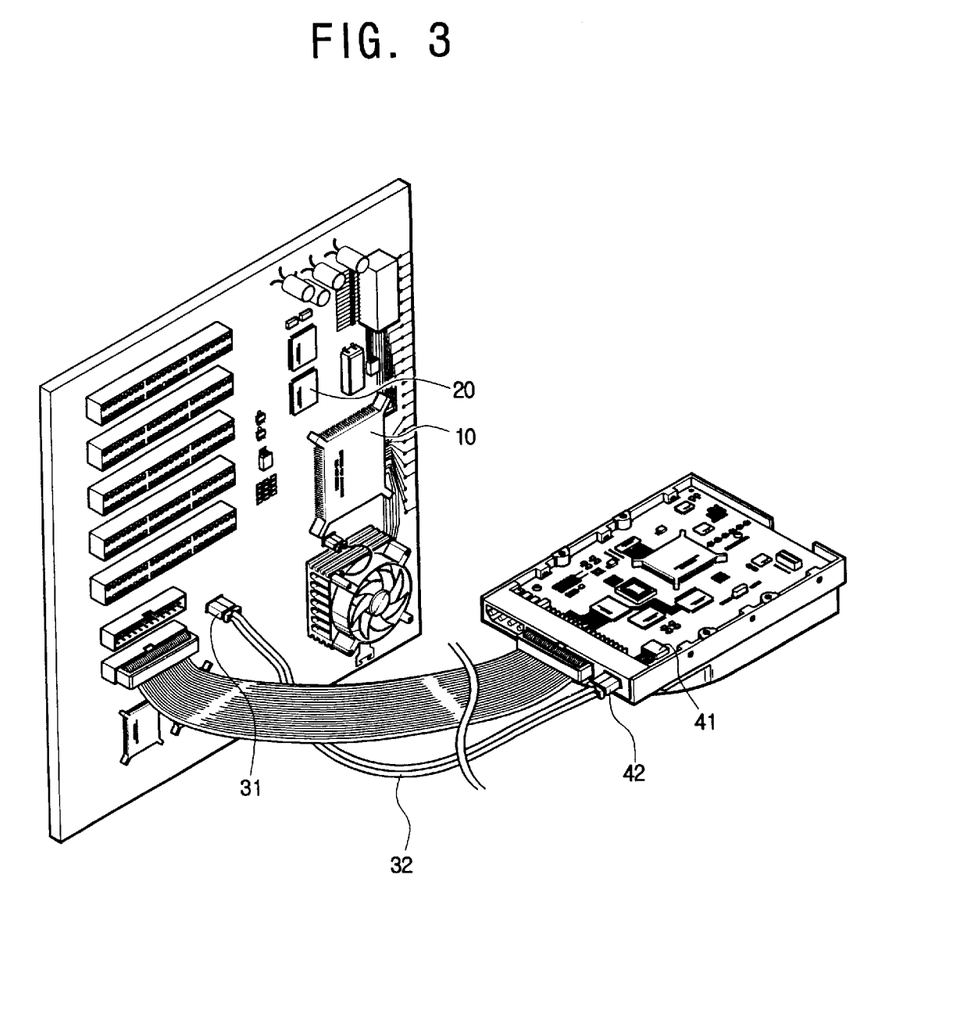
FIG. 3 is a view showing an assembly of the hard disk drive and a main board according to the present invention.

Referring to FIGS. 1 thru 3, a computer system according to the present invention comprises: a flash memory 20 which is a non-volatile memory for storing therein BIOS data for basic operation of the computer system; a central processing unit (CPU) 10 for reading the BIOS data from the flash memory 20 and booting the computer system; a hard disk drive 40 which is an auxiliary storage unit for storing therein a variety of data and information on an operating system of the computer system; a hard disk controller (not shown) for outputting control signals to drive the hard disk drive 40 according to commands received from the CPU 10; and a main board 30 for driving the operating system of the computer system in cooperation with the CPU 10 and the hard disk drive 40.

The flash memory 20 possesses the features of a ROM, preserving information stored therein even under a state of electrical disconnection, and a RAM to write and read thereon. A ROM BIOS 23 is formed within the flash memory 20 and, accordingly, a POST (power on self-test) routine is executed when the computer system is booted, to check the hardware of the system and the state of the hard disk drive 40. When external power is supplied to the computer system, the ROM BIOS 23 executes the POST routine, and thereby, each part of the computer system is checked and the peripheral devices thereof are also checked.

The CPU 10 boots the computer system based on the BIOS data read from the ROM BIOS 23 within the flash memory 20.

The hard disk drive 40, storing the operating system therein, includes an information memory 41 providing both write and read capabilities, and a memory port 42 (see FIG. 2).

The information memory 41, which is an electrically erasable and programmable ROM (EEPROM), stores information on the operating system according to driving of an information storage part 51, within an OS install CD 50 to be described later, when installing the operating system in the hard disk drive 40. The EEPROM 41 is a memory in which stored information can be electrically erased and new information can be written therein by means of a PROM writer. Thus, the EEPROM 41 can erase the stored information and store new information when installing a new operating system in the hard disk drive 40.

The memory port 42 is a data communication port provided within the hard disk drive 40 for receiving information data transmitted from a GPIO (General Purpose Input Output) port 31 within the main board 30, and for transmitting the information stored in the information memory 41 to a BIOS controller 25 to be described later.

The OS install CD 50 for storing information on an operating system is provided separately from the computer system. The information storage part 51, contained in the install CD 50, is a kind of program which senses the information on the operating system stored in the hard disk drive 40 through the GPIO port 31, and stores it in the information memory 41 provided in the hard disk drive 40.

The main board 30 comprises the GPIO port 31 and a connection cable 32 (see FIG. 3). A user installs the operating system in the hard disk drive 40 by running the OS install CD 50. The information storage part 51 is driven at the same time as the installation of the operating system terminates to allow the information on the operating system to be stored in the information memory 41 in the hard disk drive 40 through the GPIO port 31. The connection cable 32 is provided between the information memory 41 and the GPIO port 31 of the main board 30, and through the cable 32 the information on the operating system is transmitted to the information memory 41 from the install CD 50, and the OS information of the information memory 41 is transmitted to the BIOS controller 25.

The BIOS controller 25 is provided within the ROM BIOS 23 of the flash memory 20. The ROM BIOS 23 activates the POST routine at the same time that external power is supplied to the computer system so as to check the hardware thereof and the state of the hard disk drive 40. The BIOS controller 25, provided in the ROM BIOS 23, checks the state of the hard disk drive 40, and then checks whether the information memory 41 is provided in the hard disk drive 40.

When the information memory 41 is provided in the hard disk drive 40, the BIOS controller 25 reads the information on the operating system as stored in the information memory 41, and automatically sets up the BIOS table.

Figure 4:
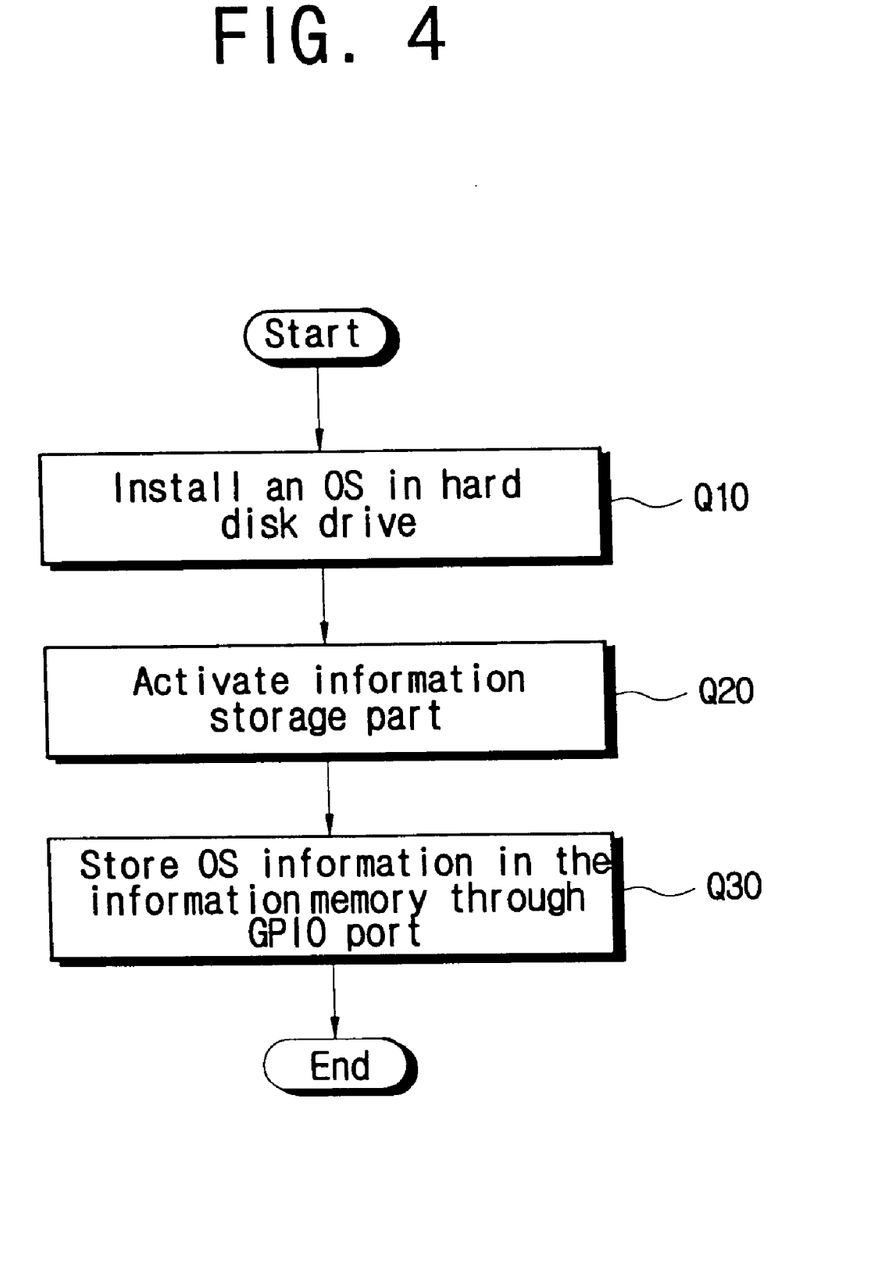
FIG. 4 is a flow chart showing a process of storing information on an operating system of the computer system according to the present invention.
Figure 5:
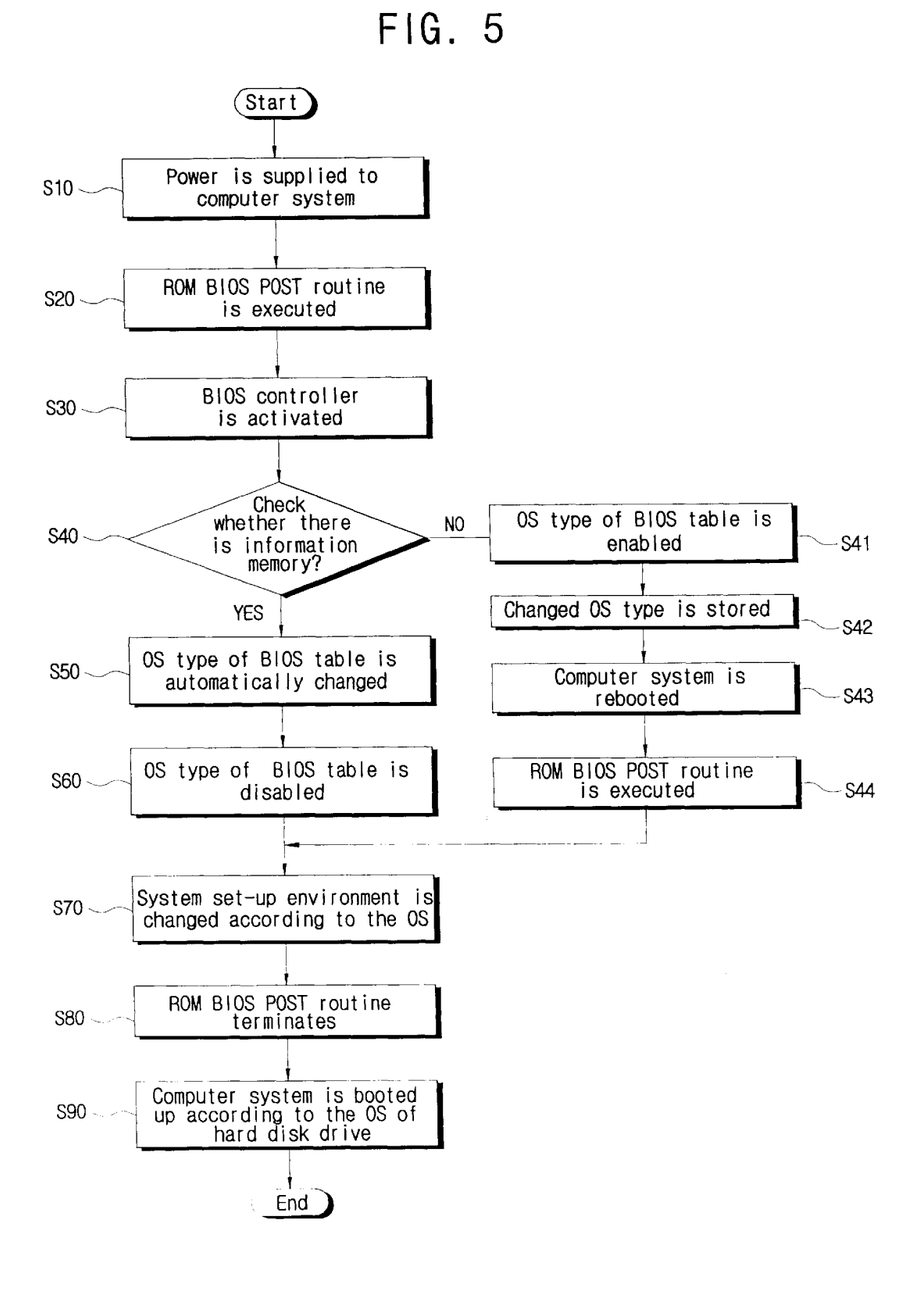
FIG. 5 is a flow chart showing a process of automatically setting up the information on the operating system of the computer system and rebooting it according to the present invention.

The process of storing OS information on the information memory 41 of the computer system according to the present invention automatically sets up the BIOS table by means of the stored OS information, and then boots up the computer system, and will be described with respect to FIGS. 4 and 5.

A user installs an operating system to boot his or her computer system in the hard disk drive 40, which has the information memory 41, by means of the OS install CD 50 having the information storage part 51 (Q10). When the installation of the operating system is finished, the information storage part 51 provided in the install CD 50 is activated (Q20). The information storage part 51 stores information on the operating system stored in the hard disk drive 40 in the information memory 41 through the memory port 42 of the hard disk drive 40 by means of the GPIO port 31 of the main board 30 (Q30).

After an existing hard disk drive is replaced with the hard disk drive 40 storing the operating system and the OS information therein, external power is supplied to the computer system (S10). If the power is supplied, the CPU 10 of the computer system outputs an address signal to enable a controller (not shown). The controller enabled by the CPU 10 activates a ROM selection signal to read the address signal and data of the flash memory 20. Subsequently, the ROM BIOS 23 within the flash memory 20 executes the POST routine to check hardware of the computer system and the state of the hard disk drive 40 (S20). The BIOS controller 25 within the ROM BIOS is activated (S30) to check whether the information memory 41 is provided in the hard disk drive 40 (S40). When the information memory 41 is provided in the hard disk drive 40, the BIOS controller 25 reads the stored OS information on the information memory 41 through the GPIO port 31 on the main board 30. Based on the OS information stored in the memory 41, the operating system type of the BIOS table is automatically changed (S50). Then, the operating system type is disabled to prevent the user from changing the OS type of the BIOS table at random (S60). In the course of checking hardware set-up parameters of peripheral devices through the CMOS set-up while the ROM BIOS 23 is executing the POST routine, the set-up environment of the computer system is changed to the operating system information set up in the BIOS table (S70). As the POST routine terminates (S80), the computer system reads the set-up parameters of the CMOS set-up and the operating system stored in the hard disk drive 40, to thereby boot the computer system (S90).

Where it is determined that the information memory 41 is not provided in the hard disk drive 40, the BIOS controller 25 enables the type of the operating system in the BIOS table of ROM BIOS 23 to allow the user to manually change the OS type (S41). The OS type is changed directly by the user (S42). Then, the computer system is rebooted (S43) and the ROM BIOS POST routine is executed (S44). Subsequent to the execution of the POST routine, the setup environment of the computer system is changed based on the operating system type set up in the BIOS table (S70), and the ROM BIOS POST routine then terminates (S80). The computer system is booted up again by reading the set-up parameters of the CMOS set up and the operating system stored in the hard disk drive 40 (S90).

Following these processes, the OS information can be automatically set up in the BIOS table by the information memory provided in the hard disk drive and the BIOS controller within the flash memory when the auxiliary memory device storing the OS of the computer system is replaced.

As described above, when the auxiliary memory device storing the OS of the computer system according to the present invention is replaced, the OS information can be automatically set up in the BIOS table, thereby providing a convenience to the user. In addition, according to the present invention, the computer system needs no rebooting thereof due to OS change in the BIOS table.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A computer system, comprising:
    a non-volatile memory for storing therein a basic input/output system (BIOS) table related to basic operation of the computer system;
    an auxiliary memory for storing an operating system of the computer system;
    an information memory provided in the auxiliary memory for storing therein information on the operating system; and
    a BIOS controller for automatically setting up the BIOS table of the non-volatile memory based on the information on the operating system stored in the information memory when a BIOS power-on self-test (POST) routine of the computer system is executed.

2. The computer system according to claim 1, wherein the BIOS controller is stored in the non-volatile memory.

3. The computer system according to claim 1, wherein the auxiliary memory comprises a hard disk drive, and the non-volatile memory comprises a flash memory.

4. The computer system according to claim 1, wherein the information memory comprises an electrically erasable programmable read-only memory (EEPROM).

5. The computer system according to claim 1, wherein the BIOS controller is configured so as to allow the BIOS table to be manually set up when the information memory is not provided in the auxiliary memory.

6. A method for setting up information on an operating system of a computer system in a basic input/output system (BIOS) table, wherein the computer system comprises a non-volatile memory for storing therein the BIOS table related to basic operation of the computer system and an auxiliary memory for storing the operating system (OS) of the computer system, said method comprising the steps of:
    providing, in the auxiliary memory, an information memory having writing and reading capabilities;
    reading the OS information from an external source so as to store the OS information in the information memory when the OS is installed in the auxiliary memory; and
    automatically setting up the BIOS table of the non-volatile memory based on the OS information stored in the information memory when a BIOS power-on self-test (POST) routine of the computer system is executed.

7. The method according to claim 6, wherein the step of automatically setting up the BIOS table is conducted by a BIOS controller stored within the non-volatile memory.

8. The method according to claim 7, wherein the BIOS controller executes the BIOS POST routine.

9. The method according to claim 8, further comprising the step of checking whether the information memory is provided in the auxiliary memory when the BIOS POST routine is executed.

10. The method according to claim 9, further comprising the step of manually setting up the BIOS table when the information memory is not provided in the auxiliary memory.

11. The method according to claim 6, wherein the auxiliary memory comprises a hard disk drive, and the non-volatile memory comprises a flash memory.

12. The method according to claim 6, wherein the information memory comprises an electrically erasable programmable read-only memory (EEPROM).

13. The method according to claim 6, further comprising the step of checking whether the information memory is provided in the auxiliary memory when the BIOS POST routine is executed.

14. The method according to claim 13, further comprising the step of manually setting up the BIOS table when the information memory is not provided in the auxiliary memory.

15. The method according to claim 6, further comprising the step of manually setting up the BIOS table when the information memory is not provided in the auxiliary memory.

16. A computer system, comprising:

non-volatile memory means for storing therein a basic input/output system (BIOS) table related to basic operation of the computer system;

auxiliary memory means for storing an operating system of the computer system;

information memory means for storing therein information on the operating system (OS); and BIOS controller means responsive to execution of a BIOS power-on self-test (POST) routine of the computer system for automatically setting up the BIOS table of the non-volatile memory means based on the information on the OS stored in the information memory means.

17. The computer system according to claim 16, wherein the BIOS controller means is stored in the non-volatile memory means.

18. The computer system according to claim 16, wherein the auxiliary memory means comprises a hard disk drive, and the non-volatile memory means comprises a flash memory.

19. The computer system according to claim 16, wherein the information memory means comprises an electrically erasable programmable read-only memory (EEPROM).

20. The computer system according to claim 16, wherein the BIOS controller means is configured so as to allow the BIOS table to be manually set up when the information memory means is not provided in the auxiliary memory means.

21. The computer system according to claim 16, wherein the information memory means is provided in the auxiliary memory means.

* * * * *